US010267357B2

(12) United States Patent
Yamauchi et al.

(10) Patent No.: US 10,267,357 B2
(45) Date of Patent: Apr. 23, 2019

(54) TAPERED ROLLER BEARING

(71) Applicant: NTN CORPORATION, Osaka (JP)

(72) Inventors: Kiyoshige Yamauchi, Mie (JP);
Takayuki Suzuki, Mie (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 15/552,166

(22) PCT Filed: Feb. 10, 2016

(86) PCT No.: PCT/JP2016/053918
§ 371 (c)(1),
(2) Date: Aug. 18, 2017

(87) PCT Pub. No.: WO2016/132983
PCT Pub. Date: Aug. 25, 2016

(65) Prior Publication Data
US 2018/0038412 A1 Feb. 8, 2018

(30) Foreign Application Priority Data

Feb. 20, 2015 (JP) ................................. 2015-031498

(51) Int. Cl.
F16C 33/36 (2006.01)
F16C 19/36 (2006.01)
(Continued)

(52) U.S. Cl.
CPC .......... F16C 19/364 (2013.01); F16C 33/366 (2013.01); F16C 33/4605 (2013.01);
(Continued)

(58) Field of Classification Search
CPC ................ F16C 19/364; F16C 33/4605; F16C 33/4635; F16C 33/6681
See application file for complete search history.

(56) References Cited

U.S. PATENT DOCUMENTS 3,179,478 A * 4/1965 Readdy ................. F16C 19/163
384/472
3,350,147 A * 10/1967 Hingley .............. F16C 33/4605
384/472
(Continued)

FOREIGN PATENT DOCUMENTS

DE 102009053090 A1 * 6/2011 ........... B21D 53/812
JP 50-58449 5/1975
(Continued)

OTHER PUBLICATIONS

International Preliminary Report on Patentability dated Aug. 22, 2017 in International (PCT) Application No. PCT/JP2016/053918.
(Continued)

Primary Examiner — Phillip A Johnson
(74) Attorney, Agent, or Firm — Wenderoth, Lind & Ponack, L.L.P.

(57) ABSTRACT

A tapered roller bearing is used in a planetary gear speed reducer, and includes an outer race, and a retainer formed with a first annular portion, a second annular portion, and pillars. At least one retainer guiding surface (raceway) which guides the retainer in a radial direction is formed only on an inner periphery of the outer race. Guided surfaces are formed at least either on the pillars or on the first and second annular portions, and guided by the at least one retainer guiding surface. Therefore, it is possible to guide an axial central portion or both side portions of the retainer, to make the retainer less likely to tilt due to a centrifugal force, and to apply a preload to both side surfaces of the outer race.

15 Claims, 13 Drawing Sheets

(51) Int. Cl.
*F16C 33/46* (2006.01)
*F16C 33/58* (2006.01)
*F16H 1/28* (2006.01)
*F16C 19/54* (2006.01)

(52) U.S. Cl.
CPC ........ F16C 33/4635 (2013.01); F16C 33/583 (2013.01); F16H 1/28 (2013.01); *F16C 19/543* (2013.01); *F16C 2326/01* (2013.01); *F16C 2361/61* (2013.01); *F16C 2361/65* (2013.01)

(56) References Cited

U.S. PATENT DOCUMENTS

| | | | | |
|---|---|---|---|---|
| 4,192,560 | A * | 3/1980 | Hartnett | F16C 19/30 384/572 |
| 8,123,412 | B2 * | 2/2012 | Koci | F04D 19/042 384/470 |
| 8,979,383 | B2 * | 3/2015 | Carter | F16C 33/6677 384/465 |
| 2012/0033907 | A1 * | 2/2012 | Huhnke | F16C 33/6629 384/473 |

FOREIGN PATENT DOCUMENTS

| | | | | |
|---|---|---|---|---|
| JP | 07004429 | A * | 1/1995 | .......... F16C 33/3806 |
| JP | 2004-293730 | | 10/2004 | |
| JP | 2005-98316 | | 4/2005 | |
| JP | 3751739 | B2 * | 3/2006 | .......... F16C 33/4605 |
| JP | 2007177837 | A * | 7/2007 | .......... F16C 33/4605 |
| JP | 2008-196582 | | 8/2008 | |
| JP | 2010-71321 | | 4/2010 | |
| JP | 2011-202714 | | 10/2011 | |
| JP | 2011241894 | A * | 12/2011 | .......... F16C 33/6681 |
| JP | 2012-241874 | | 12/2012 | |

OTHER PUBLICATIONS

International Search Report dated May 10, 2016 in International (PCT) Application No. PCT/JP2016/053918.

* cited by examiner

TAPERED ROLLER BEARING

TECHNICAL FIELD

The present invention relates to a tapered roller bearing used in a planetary gear speed reducer, particularly to guiding a retainer.

BACKGROUND ART

Dump trucks, etc. use a planetary gear speed reducer in which a large speed reduction ratio can be obtained. Planetary rotary members provided in such a planetary gear speed reducer comprise planetary gears or planetary rollers rotating about their respective axes while revolving around a gear, and supported by pins of a carrier through rolling bearings. Tapered roller bearings are used as such rolling bearings.

The centrifugal force generated from the center of the bearing when the planetary rotary member rotates about its axis, and the centrifugal force generated from the center of the speed reducer, etc. when the planetary roller revolves around a gear are applied to the retainer of such a tapered roller bearing supporting the planetary rotary member. The latter centrifugal force due to the revolution of the planetary rotary member is applied to the retainer such that the retainer is eccentric from the center of the bearing. When the speed of the planetary rotary member revolving around a gear becomes faster so that a centrifugal force becomes larger, if the retainer is guided by rolling elements, the eccentric retainer strongly brings some pillars of the retainer into abutment with tapered rollers. As a result thereof, the abutting pillars may become worn or break due to the bending moment concentrating on the roots of the pillars coupled to the annular portions of the retainer. In order to avoid this, a retainer guided by a raceway is disclosed (in the below-identified Patent documents 1 and 2).

Patent document 1 discloses a tapered roller bearing used in a planetary gear speed reducer, and including an outer race formed on its outer diameter surface with a retainer guiding surface, and a retainer formed with a small-diameter annular portion and a large-diameter annular portion. A guided surface is formed on at least one of the small-diameter annular portion and the large-diameter annular portion so as to come into sliding contact with the retainer guiding surface.

Patent document 2 discloses a tapered roller bearing including a retainer made of a steel plate and formed with a small-diameter annular portion. Guided surfaces are formed at the distal ends of protrusions formed by cutting and raising some sections of the small-diameter annular portion.

The retainer of Patent document 2 is guided at only the protrusions of the small-diameter annular portion when guided by the inner race or the outer race. Therefore, when the tapered roller bearing is used in the situation in which a large centrifugal force is generated, e.g., used to support a planetary rotary member, the retainer tends to tilt so that the contact area of the guided surfaces of the retainer decreases or the pillars interfere with the tapered rollers.

On the other hand, the contact area of the guided surface of the retainer disclosed in Patent document 1 is larger than that of the guided surfaces of the retainer disclosed in Patent document 2. Therefore, it is possible to prevent wear and seizure of the guided surface by guiding the retainer with a low contact surface pressure. If a retainer is guided by an outer race as in Patent document 1, compared to the arrangement in which the retainer is guided by an inner race, the circumferential length of the guided surface of the retainer is long so that the contact area of the guided surface is large.

PRIOR ART DOCUMENTS

Patent Documents

Patent document 1: Japanese Unexamined Patent Application Publication No. 2008-196582
Patent document 2: Japanese Unexamined Patent Application Publication No. 2004-293730

Problems to be Solved by the Invention

However, the tapered roller bearing of Patent document 1 needs to be configured such that the retainer extends up to the outer diameter surface of the outer race so as to pass along the small diameter side of the outer race. Therefore, the side surface of the outer race on its small diameter side cannot be fixed to a housing shoulder. As a result thereof, such tapered roller bearings can be used only in a back-to-back relationship, and also a preload cannot be applied thereto. It is preferable that a preload can be applied to a tapered roller bearing used in a planetary gear speed reducer, because if a preload is not applied to the tapered roller bearing, due to the specifications of the planetary gear speed reducer, the tapered roller bearing may not be able to stably support a planetary rotary member due to a positive gap in the interior of the bearing, so that the planetary rotary member may not function in a normal manner, e.g., may not mesh in a normal manner.

SUMMARY OF THE INVENTION

In view of the above background, it is an object of the present invention to provide a tapered roller bearing used in a planetary gear speed reducer, and configured such that insufficient lubrication does not occur on the guided surfaces so as to prevent wear and seizure of the guided surfaces, such that the retainer is less likely to tilt due to a centrifugal force, and such that a preload can be applied to the tapered roller bearing.

Means for Solving the Problems

In order to achieve the above object, the present invention provides a tapered roller bearing comprising: an outer race having a raceway on an inner periphery of the outer race; tapered rollers kept in rolling contact with the raceway; and a retainer including a first annular portion, a second annular portion having a diameter larger than a diameter of the first annular portion, and pillars defining pockets between the first annular portion and the second annular portion, wherein the outer race is configured to be attached to a planetary rotary member of a planetary gear speed reducer, characterized in that at least one retainer guiding surface which guides the retainer in a radial direction is formed only on the inner periphery of the outer race, and guided surfaces are formed at least either on the pillars or on the first and second annular portions, and guided by the at least one retainer guiding surface.

Since the guided surfaces, coming into contact with the at least one retainer guiding surface, are formed at least either on the pillars or on the first and second annular portions, the axial central portion of the retainer or the first and second annular portions on both axial sides of the retainer are guided by only the inner periphery of the outer race, so that when a large centrifugal force is applied to the retainer, the retainer is less likely to tilt than if only the annular portion of the retainer having a smaller diameter is guided by only the inner periphery of the outer race. Also, since the at least one retainer guiding surface is formed only on the inner periphery of the outer race, the retainer does not need to include portions extending to the outer diameter surface of the outer race, so that it is possible to apply a preload to the tapered roller bearing. Since the retainer is guided by the outer race, compared to the arrangement in which the retainer is guided by the inner race, the circumferential length of the guided surfaces of the retainer is long, so that the difference in circumferential speed and the contact surface pressure are low. Also, since lubricant oil is moved toward the outer race due to a centrifugal force, lubricant oil shortage is less likely to occur on the guided surfaces, so that it is possible to prevent wear and seizure of the guided surfaces.

Preferably, the retainer is made of a resin. If the retainer is made of a resin, compared to a retainer made of a steel plate, there are the following advantages: the pillars have a small friction coefficient, and thus are less likely to become worn; since the retainer, made of a resin, is soft, even if the pillars become worn, attack on the rolling surfaces of the tapered rollers is less severe, so that the bearing is less likely to become damaged; and since the retainer, made of a resin, is lightweight, attack on the outer and inner races due to a centrifugal force generated when the tapered rollers roll while revolving around the inner race is less severe, so that the bearing is less likely to become damaged.

Preferably, the tapered roller bearing is configured such that the retainer is made of a steel plate, and the guided surfaces comprise coating portions having a friction coefficient lower than a friction coefficient of the steel plate. With this arrangement, it is possible to ensure low friction of the guided surface of the retainer comparable to a retainer made of a resin, while ensuring strength of the retainer higher than a retainer made of a resin.

Preferably, the at least one retainer guiding surface comprises the raceway. With this arrangement, the retainer guiding surface is formed by utilizing the axial length required for the raceway, and the guided surfaces are formed by utilizing the axial lengths required for the pillars. Therefore, it is not necessary to increase, or necessary to only minimally increase, the widths of the retainer and the outer race in order to guide the retainer. As a result thereof, the total width of the tapered roller bearing is not large.

Preferably, the guided surfaces lie on an imaginary convex surface. With this arrangement, lubricant oil can be easily introduced into the contact portions of the retainer guiding surface and the guided surfaces, so that it is possible to prevent wear of the guided surfaces resulting from insufficient lubrication.

Preferably, the at least one retainer guiding surface comprises two retainer guiding surfaces located axially outwardly of the raceway, and each formed with a groove recessed from the retainer guiding surface, and helically extending about a center axis of the outer race. With this arrangement, the guided surfaces are arranged on the respective annular portions of the retainer, the two retainer guiding surface are arranged on the portions of the outer race which are located outside of the raceway, and which do not affect the rolling of the tapered rollers, and grooves or recesses can be freely formed in the respective retainer guiding surfaces so as to be recessed from the guiding surfaces. If, as such recessed grooves, grooves are used which helically extend about the center axis of the outer race, the grooves function as paths through which lubricant oil is introduced into the contact areas where the retainer guiding surfaces come into contact with the respective guided surfaces, so that lubricant oil is likely to remain in these contact areas. Therefore, it is possible to prevent wear of the guided surfaces resulting from insufficient lubrication.

Preferably, the guided surfaces are formed with grooves recessed from the respective guided surfaces, and helically extending about a center axis of the retainer. With this arrangement, the grooves function as paths through which lubricant oil is introduced into the contact areas where the retainer guiding surfaces come into contact with the respective guided surfaces, so that lubricant oil is likely to remain in these contact areas. Therefore, it is possible to prevent wear of the guided surfaces resulting from insufficient lubrication.

Preferably, the at least one retainer guiding surfaces comprises two retainer guiding surfaces located axially outwardly of the raceway, and each formed with herringbone grooves recessed from the retainer guiding surface, and circumferentially spaced apart from each other at regular intervals. With this arrangement, the guided surfaces are arranged on the respective annular portions of the retainer, and the two retainer guiding surfaces are arranged on the portions of the outer race located outside of the raceway. While the bearing is operating, lubricant oil is gathered into the herringbone grooves, and an oil film is formed between the contact portions of each retainer guiding surface and the corresponding guided surface. Therefore, it is possible to prevent wear of the guided surfaces resulting from insufficient lubrication.

Preferably, the guided surfaces are formed with herringbone grooves recessed from the guided surfaces, and circumferentially spaced apart from each other at regular intervals. With this arrangement, lubricant oil is gathered into the herringbone grooves, and an oil film is formed between the contact portions of each retainer guiding surface and the corresponding guided surface. Therefore, it is possible to prevent wear of the guided surfaces resulting from insufficient lubrication.

Effects of the Invention

As described above, the tapered roller bearing of the present invention, used in a planetary gear speed reducer, is configured such that insufficient lubrication does not occur on the guided surfaces so as to prevent wear and seizure of the guided surfaces, such that the retainer is less likely to tilt due to a centrifugal force, and such that a preload can be applied to the tapered roller bearing.

BEST MODE FOR CARRYING OUT THE INVENTION

Figure 1:
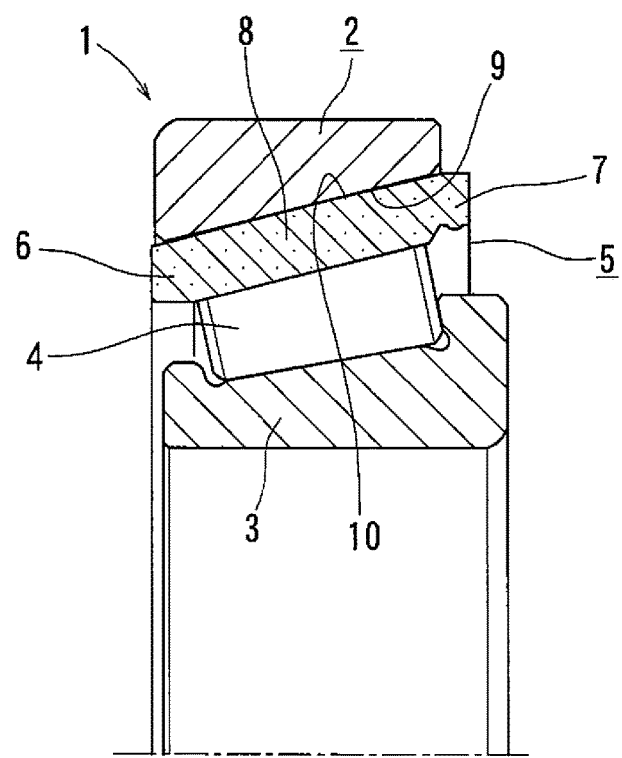
FIG. 1 is a sectional view of a tapered roller bearing according to a first embodiment of the present invention.

The tapered roller bearing according to the first embodiment of the present invention is now described with reference to the attached drawings. As shown in FIG. 1, the tapered roller bearing 1 includes an outer race 2, an inner race 3, a plurality of tapered rollers 4 provided between the outer race 2 and the inner race 3, and a retainer 5 retaining the tapered rollers 4. The center axes of the outer race 2 and the retainer 5 coincide with the center axis of the tapered roller bearing 1. The direction along the center axis of the bearing 1 is hereinafter simply referred to as the "axial direction"; the direction perpendicular to the center axis of the bearing 1 is hereinafter simply referred to as the "radial direction"; and the direction about the center axis of the bearing 1 is hereinafter simply referred to as the "circumferential direction".

The retainer 5 includes a first annular portion 6, a second annular portion 7 having a diameter larger than that of the first annular portion 6, and pillars 8 defining pockets between the first annular portion 6 and the second annular portion 7. The tapered rollers 4 are each received in one of the pockets so that each adjacent pair of tapered rollers 4 are circumferentially spaced apart from each other by the corresponding pillar 8 of the retainer 5.

The outer race 2 includes, on its inner periphery, a raceway 9 comprising a conical surface having a center at the center axis of the outer race 2. The tapered rollers 4 are in rolling contact with the raceway 9.

The raceway 9 constitutes a retainer guiding surface by which the retainer 5 is guided in the radial direction.

The retainer 5 has guided surfaces 10 guided by the raceway 9 as the retainer guiding surface. The guided surfaces 10 are constituted by outer peripheries of the pillars 8, an outer periphery of the first annular portion 6, and an outer periphery of the second annular portion 7, and lie on an imaginary conical surface similar in shape to the raceway 9. More specifically, the guided surfaces 10 are constituted by the entire outer peripheries of the pillars 8, the entire circumference of the outer periphery of the first annular portion 6 at its end close to the pillars 8, and the entire circumference of the outer periphery of the second annular portion 7 at its end close to the pillars 8. The guided surfaces 10 can thus come into contact with the raceway 9 in the radial direction, at any circumferential portion thereof.

The tapered roller bearing has no retainer guiding surface by which the retainer 5 is guided in the radial direction, other than the raceway 9. In other words, the raceway 9 on the inner periphery of the outer race 2 is the only retainer guiding surface, and the retainer 5 is not radially guided by the contact of the tapered rollers 4 with the pillars 8.

The retainer 5 does not include portions axially opposed to either side surface of the outer race 2. Therefore, it is possible to apply a preload to the tapered roller bearing 1 by freely utilizing both side surfaces of the outer race 2.

The retainer 5 is made of a resin such as polyamide resin (PA), polyacetal (POM), polycarbonate (PC), polyethylene terephthalate (PET), polybutylene terephthalate (PBT), polyetheretherketone (PEEK), polyphenylene sulfide (PPS), polytetrafluoroethylene (PTFE), polysulfone (PSF), polyethersulfone (PES), polyimide (PI) or polyetherimide (PEI). Such a resin may be reinforced with glass fiber (GF). For example, the retainer may be made of PA 46+GF, or PA 66+GF.

Figure 2:
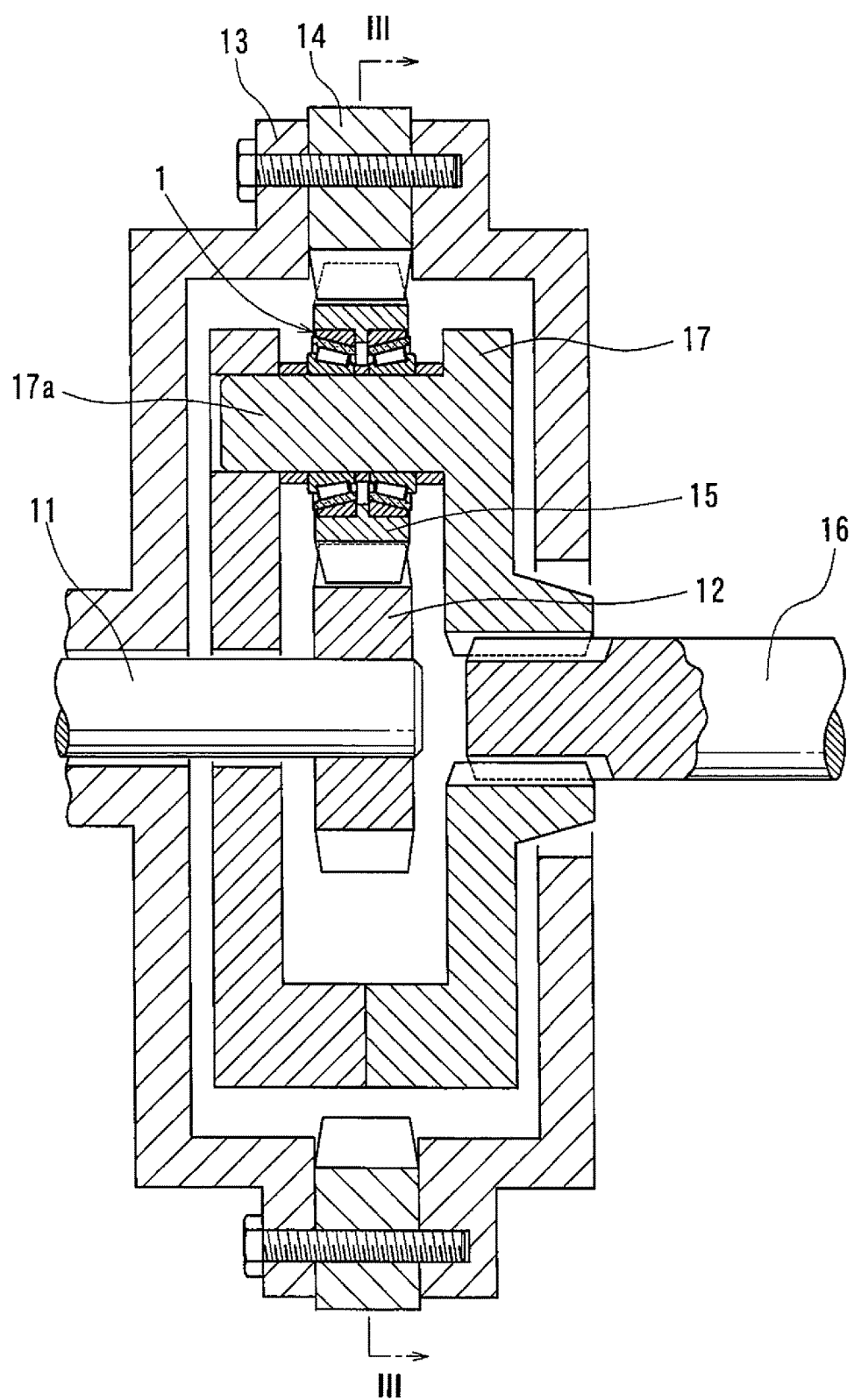
FIG. 2 is a sectional view of a planetary gear speed reducer in which the tapered roller bearing of the first embodiment is used.
Figure 3:
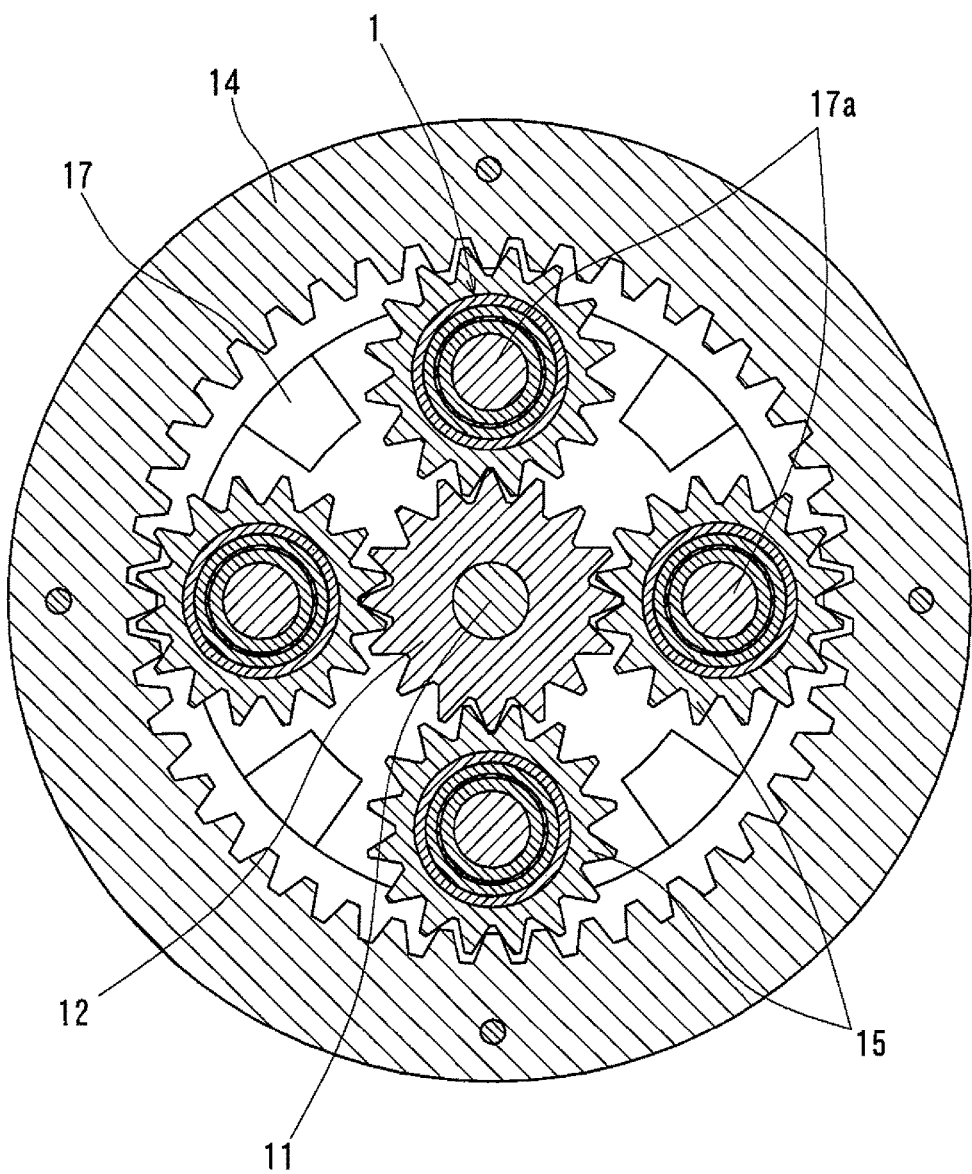
FIG. 3 is a sectional view taken along line of FIG. 2.

FIGS. 2 and 3 illustrate a planetary gear speed reducer in which tapered roller bearings 1 of the above-described configuration are used. This planetary gear speed reducer includes a sun gear 12 attached to an input shaft 11, an internal gear 14 fixed to a housing 13, a plurality of planetary rotary members 15 as planetary gears provided between, and meshing with, the sun gear 12 and the internal gear 14, and a carrier 17 coupled to an output shaft 16 and having pins 17a each rotatably supporting a planetary rotary member 15 through a pair of the tapered roller bearings 1. Thus, the planetary rotary members 15 can revolve around the sun gear 12 while rotating about their respective axes, between the sun gear 12 and the internal gear 14, and the revolution of the planetary rotary members 15 is transmitted to the output shaft 16 through the carrier 17. The outer race 2 of each tapered roller bearing 1 is attached to the corresponding planetary rotary member 15 so as to rotate together with the planetary rotary member 15. The pair of tapered roller bearings 1 corresponding to each planetary rotary member 15 are arranged in a back-to-back relationship.

Since the tapered roller bearings 1 used in this speed reducer are configured as described above, and thus, the retainer 5 of each tapered roller bearing 1 has guided surfaces 10 configured to come into contact with the raceway 9 as the retainer guiding surface, and constituted by the entire outer peripheries of the pillars 8, and portions of the outer peripheries of the annular portions 6 and 7, not only the axial central portion of the retainer 5 but also the annular portions 6 and 7 are guided by only the inner periphery of the outer race 2. Therefore, the retainer 5 is less likely to tilt under a large centrifugal force generated when the planetary rotary members 15 rotate about their respective axes while revolving around the sun gear 12.

Since the retainer 5 of this tapered roller bearing 1 is guided by the outer race 2, compared to the arrangement in which the retainer is guided by the inner race, the circumferential length of the guided surfaces 10 of the retainer 5 is long, so that the difference in circumferential speed and the contact surface pressure, between the contact portions of the retainer guiding surface (raceway 9) and the guided surfaces 10 are low. Also, since lubricant oil is moved toward the outer race 2 due to a centrifugal force, lubricant oil shortage is less likely to occur on the guided surfaces 10, so that it is possible to prevent wear and seizure of the guided surfaces 10.

In this tapered roller bearing 1, the retainer is guided only by the raceway 9, in other words, the retainer guiding surface is formed only on the inner periphery of the outer race 2, so that the retainer 5 does not include portions extending to the outer diameter surface of the outer race 2. Therefore, it is possible to apply a preload to the tapered roller bearing 1 by freely utilizing both side surfaces of the outer race 2.

For example, with one side surface of the outer race 2 brought into abutment with a shoulder integral with the inner periphery of the planetary rotary member 15, by pressing the other side surface of the outer race 2 toward the shoulder by use of e.g., a fixing lid or a spring, it is possible to apply a preload to the bearing to create a negative internal gap in the bearing. By applying a preload to the pair of tapered roller bearings 1 corresponding to each planetary rotary member 15, the pair of tapered roller bearings 1 can support the planetary rotary member 15 without becoming unstable. As a result thereof, it is possible to stabilize the motion of the planetary rotary members 15 such that the planetary rotary members 15 can reliably mesh with the sun gear 12 and the internal gear 14 in a normal manner.

Since the retainer guiding surface of this tapered roller bearing 1 consists only of the raceway 9, the retainer guiding surface is formed on the inner periphery of the outer race 2 by utilizing the axial length required for the raceway 9, and the guided surfaces 10 are formed by utilizing the axial lengths required for the pillars 8. Therefore, it is not necessary to increase, or necessary to only minimally increase, the widths of the retainer and the outer race in order to guide the retainer 5.

Since the retainer 5 of this tapered roller bearing 1 is made of a resin, compared to a retainer made of a steel plate, there are the following advantages: the pillars 8 have a relatively small friction coefficient, and thus are less likely to become worn; since the retainer 5 is relatively soft, even if the pillars 8 become worn, attack on the rolling surfaces of the tapered rollers 4 is less severe, so that the bearing is less likely to become damaged; and since the retainer 5 is relatively lightweight, attack on the outer race 2 and the inner race 3 due to a centrifugal force generated when the tapered rollers 4 roll while revolving around the inner race is less severe, so that the bearing is less likely to become damaged.

Figure 4:
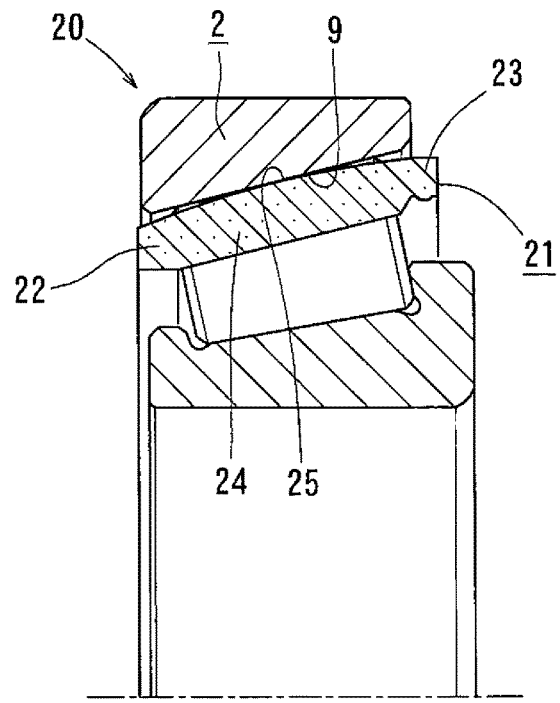
FIG. 4 is a sectional view of a tapered roller bearing according to a second embodiment of the present invention.

The second embodiment is now described with reference to FIG. 4. Only the features of the second embodiment different from those of the first embodiment are described below. The retainer 21 of the tapered roller bearing 20 according to the second embodiment is formed with guided surfaces 25 formed on the first and second annular portions 22 and 23, and the pillars 24, and lying on an imaginary convex surface.

The imaginary convex surface on which the guided surfaces 25 lie has an outer diameter which is uniform in the circumferential direction, is the largest at the axial central portions of the outer peripheries of the pillars 24, and gradually decreases therefrom in the axial direction toward the outer peripheries of the first and second annular portions 22 and 23, respectively. Gaps are therefore defined between the retainer guiding surface (raceway 9) and the guided surfaces 25 to extend from the contact portions of the raceway 9 and the guided surfaces 25 toward the exterior of the bearing, so that lubricant oil is introduced into the contact portions thereof through these gaps. If the retainer 21 tilts from the position illustrated in FIG. 4, the contact portions of the guided surfaces 25 that are in contact with the raceway 9 are axially displaced so that one of the above-mentioned gaps on one side of the contact portions widens, while the other of the gaps narrows. Thus, both of the gaps will never disappear simultaneously.

Since the tapered roller bearing 20 has guided surfaces 25 that lie on an imaginary convex surface, lubricant oil can be easily introduced through the above gaps into the contact portions of the retainer guiding surface (raceway 9) and the guided surfaces 25, so that it is possible to prevent wear of the guided surfaces 25 resulting from insufficient lubrication.

Figure 5:
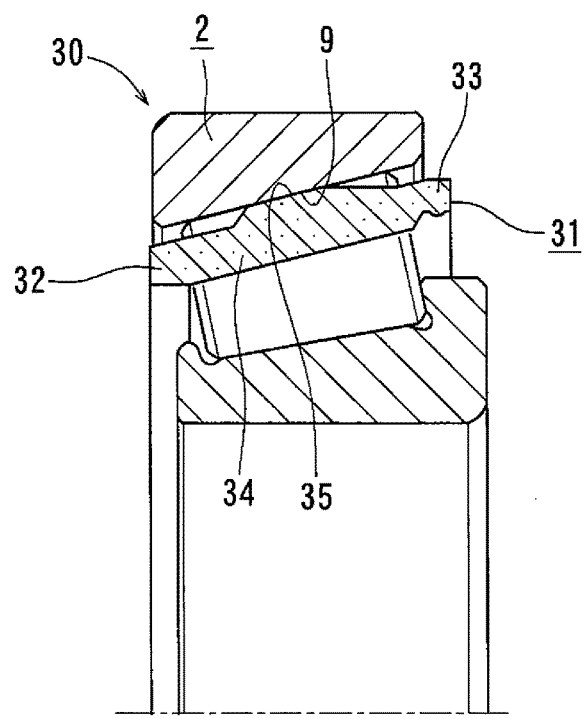
FIG. 5 is a sectional view of a tapered roller bearing according to a third embodiment of the present invention.

The third embodiment is now described with reference to FIG. 5. The retainer 31 of the tapered roller bearing 30 according to the third embodiment has guided surfaces 35 formed only on predetermined axial areas of the pillars 34 which include the axial centers of the outer peripheries of the pillars 34, and no guided surfaces are formed on either of the annular portions 32 and 33.

The retainer 31 of this tapered roller bearing 30 is not in contact with, and thus not guided by, the outer race 2 at its annular portions 32 and 33, and is guided, at only the axial central portion of the retainer 31, by only the inner periphery of the outer race 2. Therefore, while the tilt of the retainer can be prevented more reliably in the first embodiment than in the third embodiment, the contact area of the retainer guiding surface coming into contact with the guided surfaces is smaller in the third embodiment than in the first embodiment. The tapered roller bearing 30 of the third embodiment is therefore suitable for the situation in which the torque of the bearing needs to be reduced while sufficiently preventing tilting of the retainer.

Figure 6:
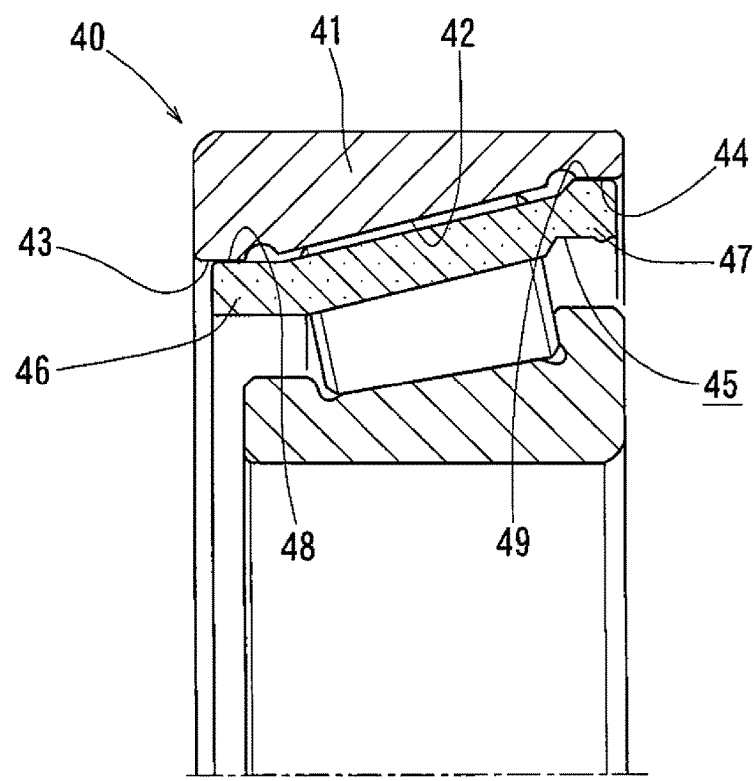
FIG. 6 is a sectional view of a tapered roller bearing according to a fourth embodiment of the present invention.

The fourth embodiment is now described with reference to FIG. 6. The outer race 41 of the tapered roller bearing 40 according to the fourth embodiment has inner peripheral ends located axially outwardly of the raceway 42. Small-diameter and large-diameter retainer guiding surfaces 43 and 44 are formed on the respective inner peripheral ends of the outer race 41, and there are no other retainer guiding surfaces. The retainer 45 of this tapered roller bearing 40 includes first and second annular portions 46 and 47 having guided surfaces 48 and 49 formed on the respective outer peripheries of the first and second annular portions 46 and 47, and radially opposed, respectively, to the small-diameter retainer guiding surface 43 and the large-diameter retainer guiding surface 44. The retainer 45 has no guided surfaces other than the guided surfaces 48 and 49. The retainer guiding surfaces 43 and 44, and the guided surfaces 48 and 49 are all cylindrical surfaces.

The retainer of this tapered roller bearing 40 is not in contact with, and thus not guided by, the outer race 41 at the pillars of the retainer 45, and only the first and second annular portions 46 and 47 of the retainer 45 are guided by only the inner periphery of the outer race 41. Therefore, while the tilt of the retainer can be prevented more reliably in the first embodiment than in the fourth embodiment, the tilt of the retainer can be prevented more reliably in the fourth embodiment than in the third embodiment. Further, since the contact area of the retainer guiding surfaces is smaller in the fourth embodiment than in the first embodiment, it is possible to reduce the torque of the bearing.

Figure 7:
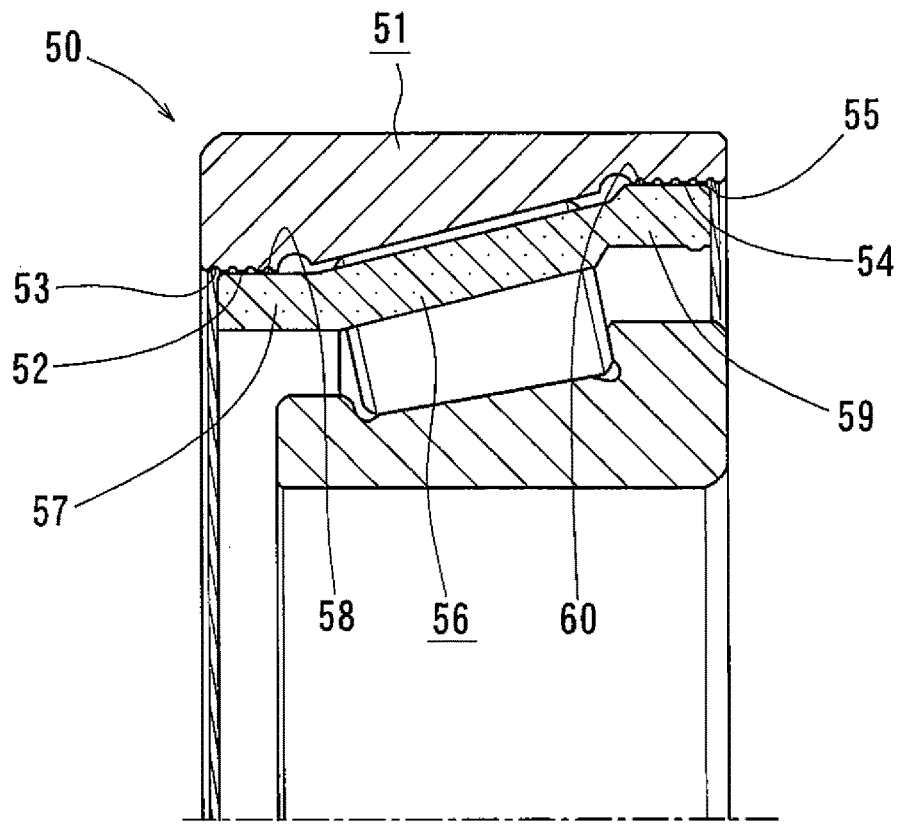
FIG. 7 is a sectional view of a tapered roller bearing according to a fifth embodiment of the present invention.
Figure 8:
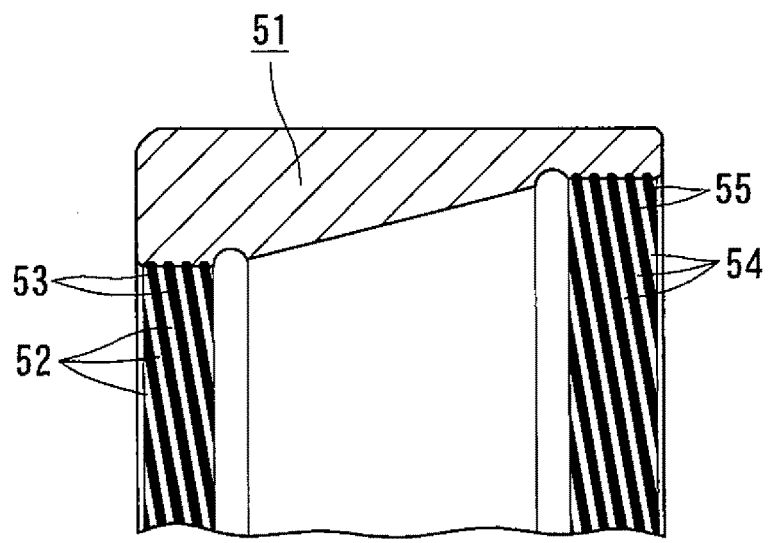
FIG. 8 is a view illustrating the helical pattern of grooves formed in the outer race of FIG. 7.

The fifth embodiment is now described with reference to FIGS. 7 and 8. The tapered roller bearing 50 according to the fifth embodiment is a modification of the fourth embodiment. In particular, in this embodiment, the outer race 51 is formed with grooves 53 radially recessed from the retainer guiding surface 52, and grooves 55 radially recessed from the retainer guiding surface 54. The patterns of the grooves 53 and 55 are illustrated by the thick solid lines in FIG. 8.

The grooves 53 and 55 helically extend about the center axis of the outer race 51. Specifically, the grooves 53 are helical grooves circumferentially extending to axially advance, and passing the axial area of the outer race 51 on which the retainer guiding surface 52 is formed. The grooves 55 are also helical grooves having the same structure as the grooves 53, and passing the axial area of the outer race 51 on which the retainer guiding surface 54 is formed.

In this embodiment, since the grooves 53 pass the contact area where the guided surface 58 of the first annular portion 57 of the retainer 56 comes into contact with the retainer guiding surface 52, the grooves 53 function as a path through which lubricant oil is introduced into this contact area, so that lubricant oil is likely to remain in this contact area. Similarly, since the grooves 55 also function as a path through which lubricant oil is introduced into the contact area where the retainer guiding surface 54 comes into contact with the guided surface 60, lubricant oil is likely to remain in this contact area too. Therefore, it is possible to prevent wear of the guided surfaces 58 and 60 resulting from insufficient lubrication in the tapered roller bearing 50.

Figure 9:
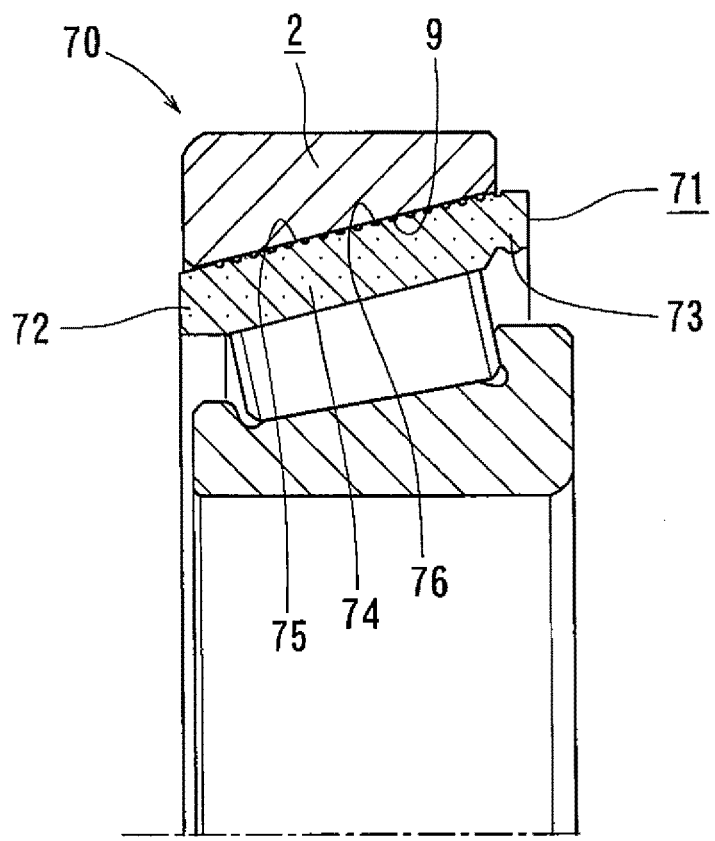
FIG. 9 is a sectional view of a tapered roller bearing according to a sixth embodiment of the present invention.
Figure 10:
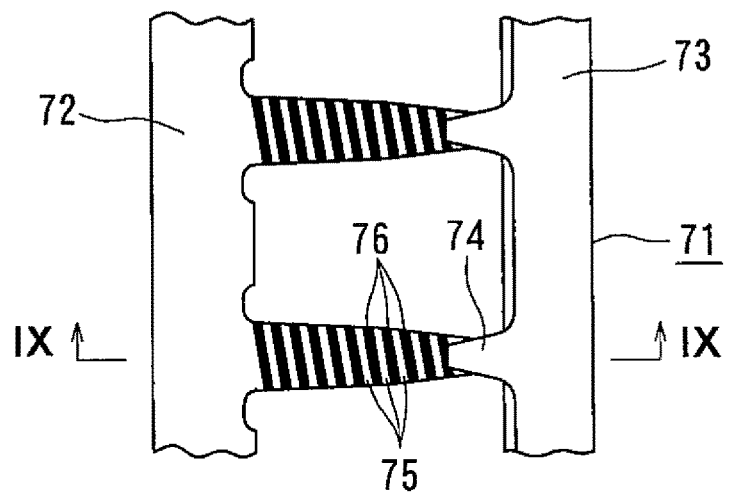
FIG. 10 is a view illustrating the helical pattern of grooves formed in the retainer of FIG. 9.

The sixth embodiment is now described with reference to FIGS. 9 and 10. The retainer 71 of the tapered roller bearing 70 according to the sixth embodiment is formed with guided surfaces 75 substantially over the entire outer peripheries of the pillars 74, and the retainer 71 has no guided surfaces other than the guided surfaces 75. The guided surfaces 75 are formed with grooves 76 radially recessed from the guided surfaces 75. The pattern of the grooves 76 is illustrated by the thick solid lines in FIG. 10. The grooves 76 helically extend about the center axis of the retainer 71. Specifically, the grooves 76 are helical grooves circumferentially extending to axially advance, and passing the axial area of the retainer 71 on which the guided surfaces 75 are formed.

Since the grooves 76 pass the contact area where the raceway 9 as the retainer guiding surface comes into contact with the guided surfaces 75, the grooves 76 function as a path through which lubricant oil is introduced into this contact area, so that lubricant oil is likely to remain in this contact area.

Figure 11:
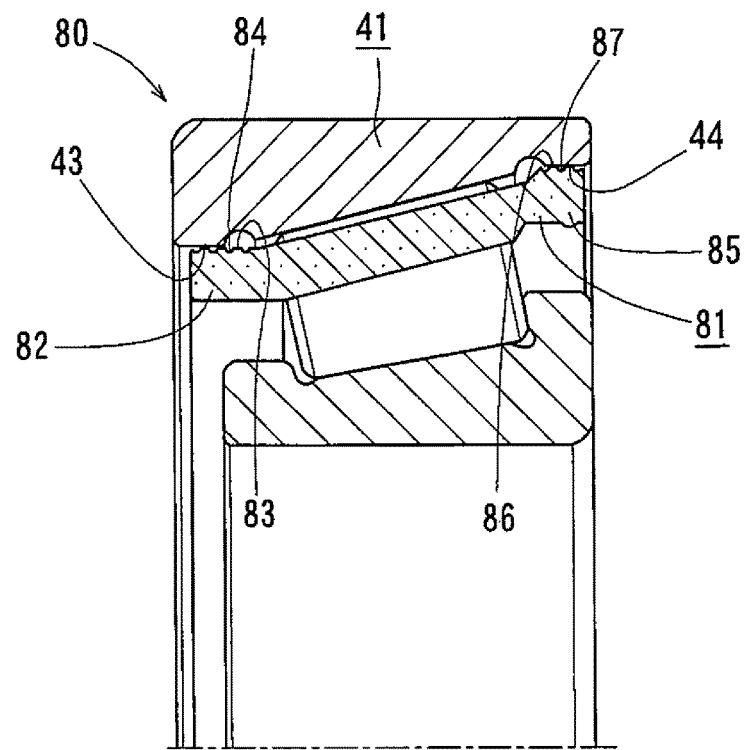
FIG. 11 is a sectional view of a tapered roller bearing according to a seventh embodiment of the present invention.
Figure 12:
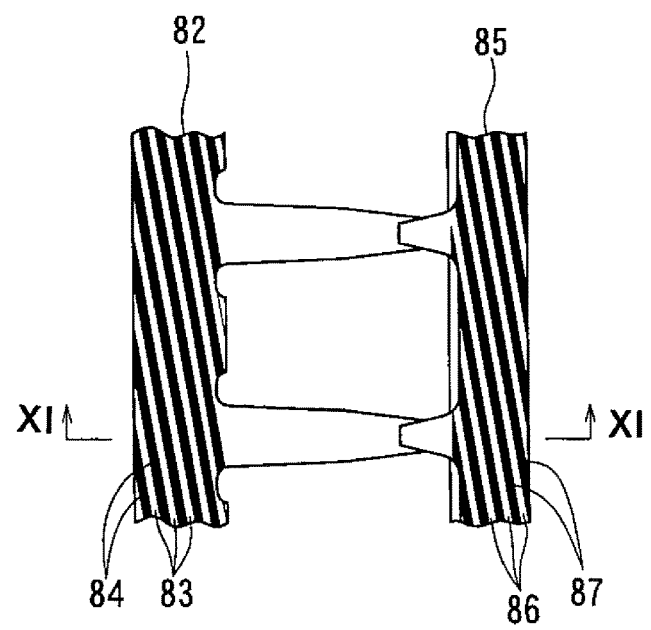
FIG. 12 is a view illustrating the helical patterns of grooves formed in the retainer of FIG. 11.

The seventh embodiment is now described with reference to FIGS. 11 and 12. The tapered roller bearing 80 according to the seventh embodiment is a modification of the fourth embodiment. In particular, in this embodiment, the first annular portion 82 of the retainer 81 is formed with grooved 84 radially recessed from the guided surface 83, while the second annular portion 85 of the retainer 81 is formed with grooves 87 radially recessed from the guided surface 86. The patterns of the grooves 84 and 87 are illustrated by the thick solid lines in FIG. 12. The grooves 84 and 87 helically extend about the center axis of the retainer 81. Specifically, the grooves 84 are helical grooves circumferentially extending to axially advance, and passing the axial area of the retainer 81 on which the guided surface 83 is formed. The grooves 87 are helical grooves circumferentially extending to axially advance, and passing the axial area of the retainer 81 on which the guided surface 86 is formed.

Since the grooves 84 pass the contact area where the retainer guiding surface 43 of the outer race 41 comes into contact with the guided surface 83, the grooves 84 function as a path through which lubricant oil is introduced into this contact area, so that lubricant oil is likely to remain in this contact area. Similarly, the grooves 87 also function as a path through which lubricant oil is introduced into the contact area where the retainer guiding surface 44 comes into contact with the guided surface 86, so that lubricant oil is likely to remain in this contact area.

Figure 13:
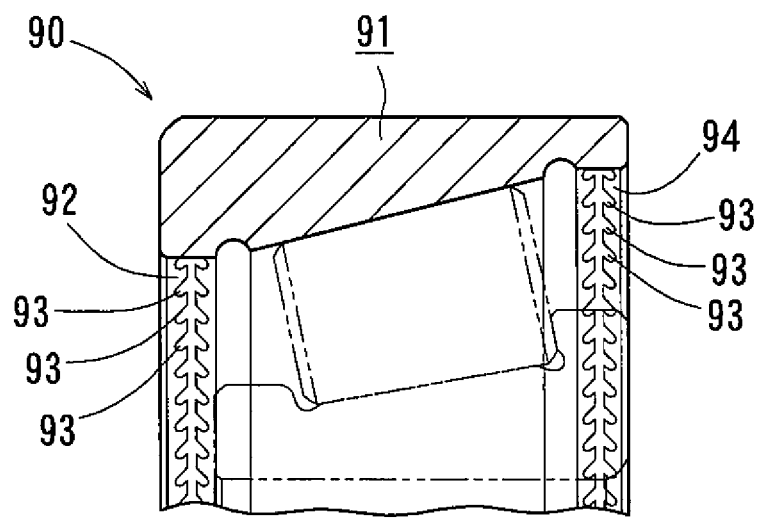
FIG. 13 is a partially enlarged sectional view illustrating an outer race according to an eighth embodiment of the present invention.

The eighth embodiment is now described with reference to FIG. 13. The tapered roller bearing 90 according to the eighth embodiment is a modification of the fourth embodiment. In particular, in this embodiment, the outer race 91 is formed with V-shaped herringbone grooves 93 radially recessed from the retainer guiding surface 92, and forming a herringbone pattern, and is formed with V-shaped herringbone grooves 93 radially recessed from the retainer guiding surface 94, and forming a herringbone pattern. As illustrated in FIG. 13, a circumferential groove intersects with the axial central portions of the respective V-shaped herringbone grooves 93 of each of the retainer guiding surfaces 92 and 94 so that lubricant oil is easily fed through the circumferential groove into the respective V-shaped herringbone grooves 93. The circumferential groove does not constitute the herringbone grooves 93, and may be omitted. The herringbone grooves 93 of each of the retainer guiding surfaces 92 and 94 are formed at the axial central area of the retainer guiding surface 92, 94 over the entire circumference thereof so as to be circumferentially spaced apart from each other at regular intervals.

The herringbone grooves 93 are configured such that while the bearing is operating, due to the rotation of the outer race 91, lubricant oil is gathered into the herringbone grooves 93, and the resulting pumping action generates dynamic pressure. Therefore, oil films are formed, respectively, between the contact portions of the retainer guiding surface 92 and the guided surface of the retainer (see the guided surface 48 in FIG. 6), and between the contact portions of the retainer guiding surface 94 and the guided surface of the retainer (see the guided surface 49 in FIG. 6). As a result thereof, it is possible to prevent wear of the guided surfaces of the retainer resulting from insufficient lubrication in the tapered roller bearing 90. The pattern of the grooves for forming oil films is not limited to that shown above, and grooves of a different pattern may be used that are known, in the field of dynamic pressure bearings, to be effective in forming oil films.

Figure 14:
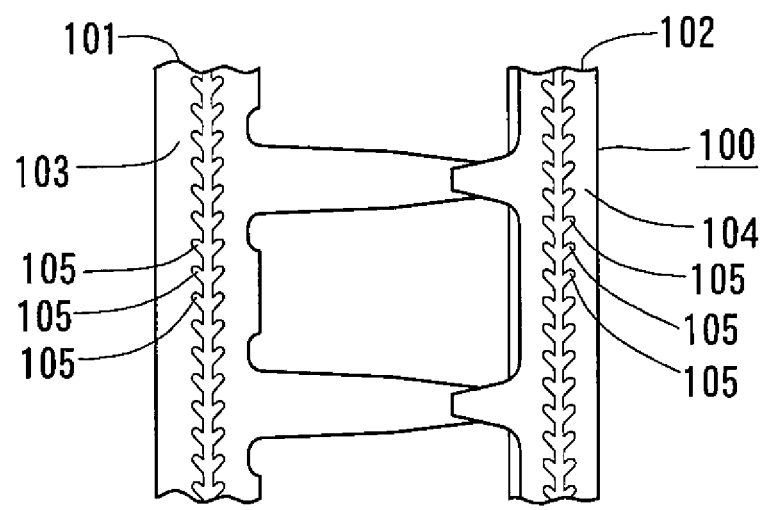
FIG. 14 is a partially enlarged sectional view illustrating the outer periphery of a retainer according to a ninth embodiment of the present invention.

The ninth embodiment is now described with reference to FIG. 14. The ninth embodiment is a modification of the fourth embodiment, in which, conversely to the eighth embodiment, the herringbone grooves are formed in the retainer. In particular, the retainer 100 of the ninth embodiment is formed with herringbone grooves 105 radially recessed from each of the guided surfaces 103 and 104 formed on the respective annular portions 101 and 102 so as to be circumferentially spaced apart from each other at regular intervals over the entire circumference of the annular portion 101, 102. When the retainer 100 rotates, lubricant oil is gathered into the herringbone grooves 105, so that oil films are formed, respectively, between the contact portions of the retainer guiding surface (see "43" in FIG. 6) and the guided surface 103, and between the contact portions of the retainer guiding surface (see "44" in FIG. 6) and the guided surface 104.

Figure 15:
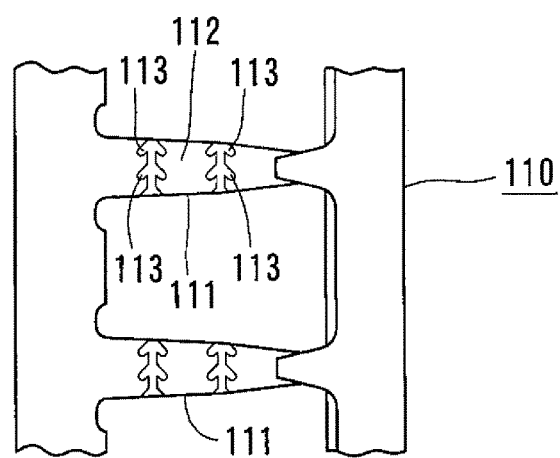
FIG. 15 is a partially enlarged sectional view illustrating the outer periphery of a retainer according to a tenth embodiment of the present invention.

The tenth embodiment is now described with reference to FIG. 15. As illustrated in FIG. 15, the retainer 110 according to the tenth embodiment is formed with herringbone grooves 113 radially recessed from guided surfaces 112 formed on the outer peripheries of the pillars 111. The herringbone grooves 113 are formed over the entire circumferential areas of the respective pillars 111 so as to be circumferentially spaced apart from each other at regular intervals. When the retainer 110 rotates, lubricant oil is gathered into the herringbone grooves 113, so that oil films are formed between the contact portions of the retainer guiding surface (see "raceway 9" in FIG. 1) and the guided surface 112.

Figure 16:
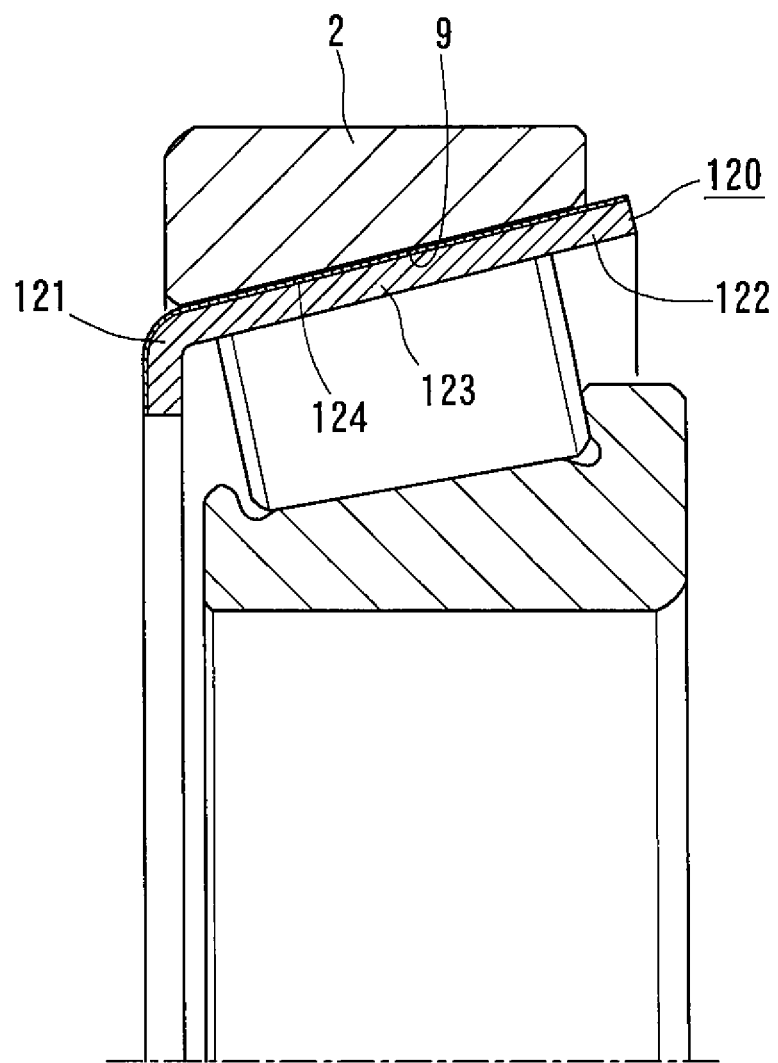
FIG. 16 is a sectional view of a tapered roller bearing according to an eleventh embodiment of the present invention.

The eleventh embodiment is now described with reference to FIG. 16. The retainer 120 according to the eleventh embodiment is formed from a steel plate such that the first annular portion 121 is flange-shaped, while the second annular portion 122 and the pillars 123 are cone-shaped.

A coating is applied to the entire surface of the steel plate constituting the outer periphery of the retainer 120 to form, on the surface of the steel plate, coating portions 124 that constitute guided surfaces coming into contact with the raceway 9 as the retainer guiding surface. The coating portions 124 are layers having a friction coefficient lower than that of the surface of the steel plate. The coating portions 124 are formed on the retainer 120 in order to ensure smoother sliding between the outer race 2 and the retainer 120 than if no such coating is applied to the surface of the steel plate, and are provided by coating the surface of the steel plate with a material such as fluororesin, molybdenum, DLC, ceramics, teflonchrome, or hard chrome plating, The tapered roller bearing of the eleventh embodiment ensures low friction of the guided surface (coating portions 124) of the retainer comparable to a retainer made of a resin, while ensuring strength of the retainer higher than a retainer made of a resin.

Figure 17:
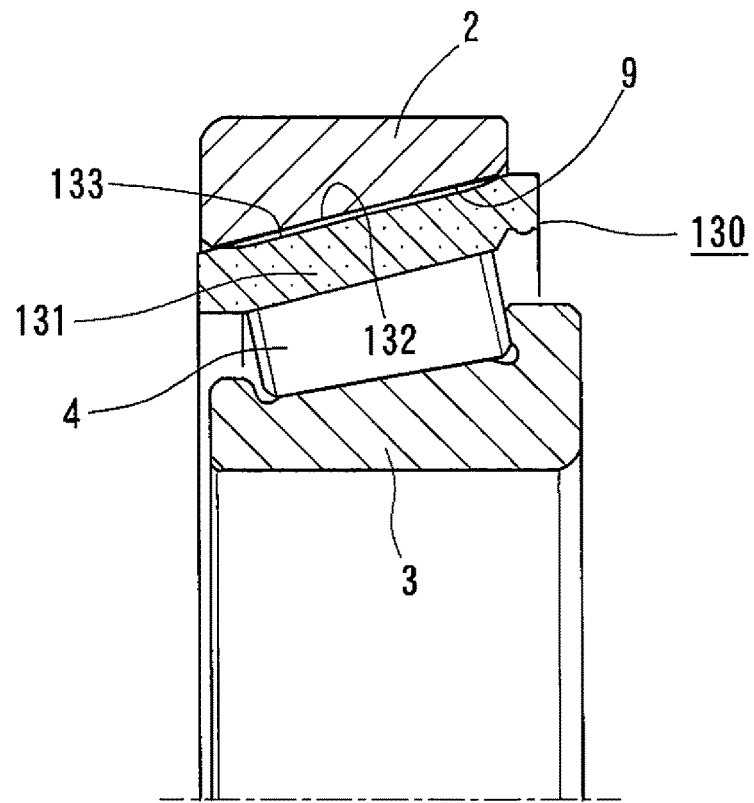
FIG. 17 is a sectional view of a tapered roller bearing according to a twelfth embodiment of the present invention.
Figure 18:
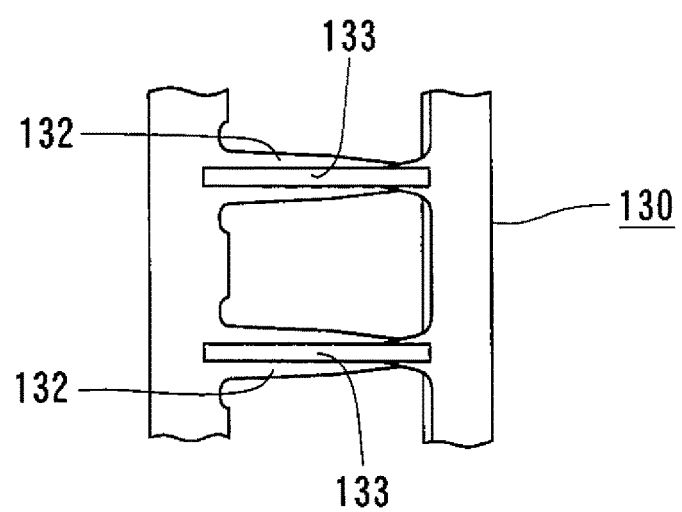
FIG. 18 is a partially enlarged sectional view illustrating the outer periphery of the retainer of FIG. 17.

The twelfth embodiment is now described with reference to FIGS. 17 and 18. As illustrated in FIGS. 17 and 18, the retainer 130 according to the twelfth embodiment is formed with oil grooves 133 radially recessed from the guided surfaces 132 on the respective pillars 131. The oil grooves 133 have a semicircular section, and extend along the circumferential centers of the respective pillars 131 over the entire lengths of the pillars 131. While the bearing is operating, lubricant oil remains in the oil grooves 133. Therefore, the oil grooves 133 function as paths through which lubricant oil is fed between the guided surfaces 132 and the retainer guiding surface (raceway 9). Due to the lubricant oil fed through the oil grooves 133 to the contact portions of the guided surfaces 132 and the retainer guiding surface (raceway 9) when the retainer 130 rotates, it is possible to prevent insufficient lubrication at the contact portions thereof.

Figure 19:
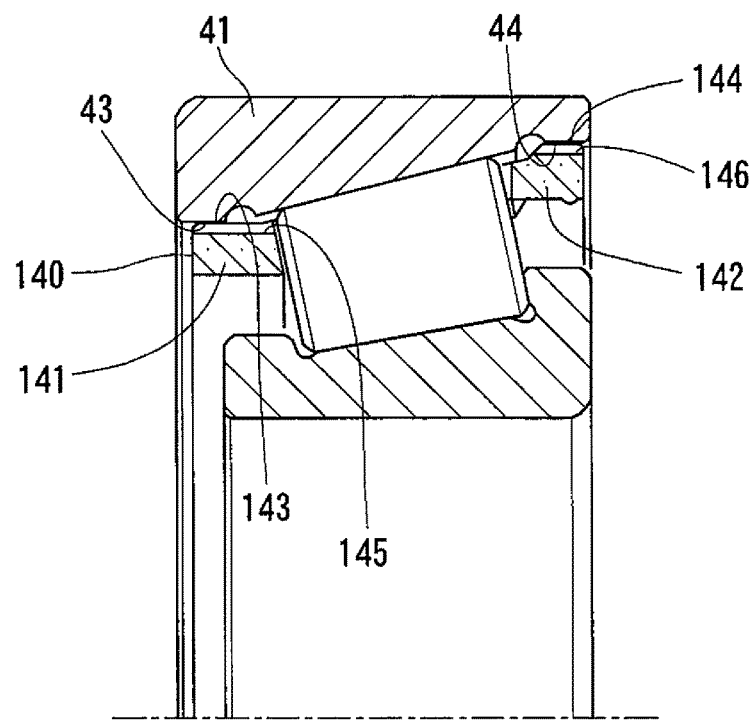
FIG. 19 is a sectional view of a tapered roller bearing according to a thirteenth embodiment of the present invention.
Figure 20:
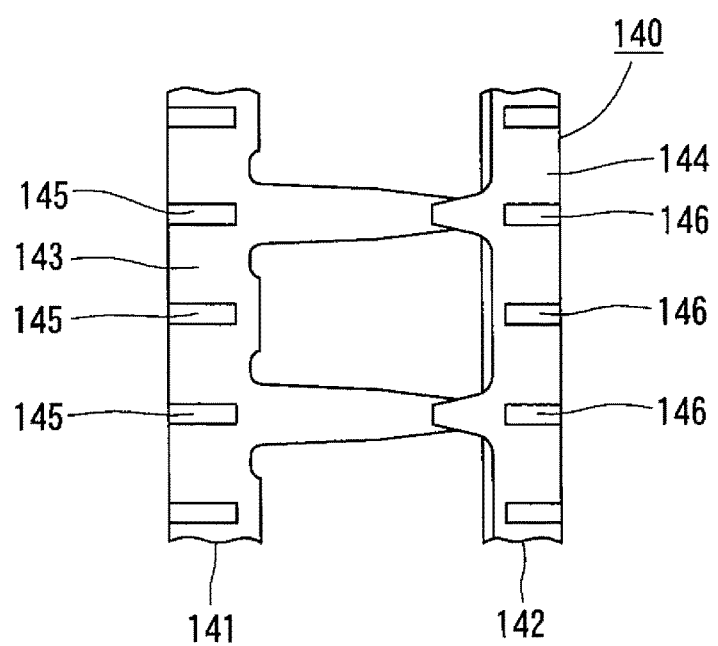
FIG. 20 is a partially enlarged sectional view illustrating the outer periphery of the retainer of FIG. 19.

The thirteenth embodiment is now described with reference to FIGS. 19 and 20. The retainer 140 according to the thirteenth embodiment is a modification of the fourth embodiment. In this embodiment, the first annular portion 141 is formed with oil grooves 145 radially recessed from the guided surface 143 so as to be circumferentially spaced apart from each other at regular intervals over the entire circumference of the first annular portion 141. The second annular portion 142 is formed with oil grooves 146 radially recessed from the guided surface 144 so as to be circumferentially spaced apart from each other at regular intervals over the entire circumference of the second annular portion 142. The oil grooves 145 and the oil grooves 146 have a semicircular cross section, and axially extend across the first annular portion 141 and the second annular portion 142, respectively. While the bearing is operating, the oil grooves 145 and 146 function as paths through which lubricant oil is fed. Due to the lubricant oil fed, through the oil grooves 145 and the oil grooves 146, respectively, to the contact portions of the retainer guiding surface 43 and the guided surface 143, and to the contact portions of the retainer guiding surface 44 and the guided surface 144 when the retainer 140 rotates, it is possible to prevent insufficient lubrication at these contact portions.

The technical scope of the present invention is not limited to the above embodiments, and includes all modifications within the scope of the technical ideas based on the claims. For example, the guided surfaces formed on portions of the pillars in FIG. 5 may be modified to lie on an imaginary convex surface, and the guided surface formed on each annular portion in FIG. 6 may be modified to a convex surface. The helical groove or the herringbone grooves may be formed in either or both of the retainer guiding surface and the guided surfaces.

DESCRIPTION OF REFERENCE NUMERALS 1, 20, 30, 40, 50, 70, 80, 90: tapered roller bearing
2, 41, 51, 91: outer race
4: tapered roller
5, 21, 31, 45, 56, 71, 81, 100, 110, 120, 130, 140: retainer
6, 22, 32, 46, 57, 72, 82, 101, 121, 141: first annular portion
7, 23, 33, 47, 59, 73, 85, 102, 122, 142: second annular portion
8, 24, 34, 74, 111, 123, 131: pillar
9, 42: raceway
43, 44, 52, 54, 92, 94: retainer guiding surface
10, 25, 35, 48, 49, 58, 60, 75, 83, 86, 103, 104, 112, 132, 143, 144: guided surface
15: planetary rotary member
53, 55, 76, 84, 87: groove
93, 105, 113: herringbone groove
124: coating portion
133, 145, 146: oil groove

The invention claimed is:

1. A tapered roller bearing comprising:
an outer race having a raceway on an inner periphery of the outer race;
tapered rollers; and
a retainer including a first annular portion, a second annular portion having a diameter larger than a diameter of the first annular portion, and pillars defining pockets between the first annular portion and the second annular portion,
wherein the outer race is configured to be attached to a planetary rotary member of a planetary gear speed reducer,
wherein at least one retainer guiding surface which guides the retainer in a radial direction is formed only on an inner periphery of the outer race,
wherein the retainer includes guided surfaces formed only on predetermined axial areas of the pillars which include axial centers of outer peripheries of the pillars, and no guided surfaces are formed on either of the first and second annular portions,
wherein the guided surfaces are guided by the at least one retainer guiding surface, and
wherein each of the predetermined axial areas of the guided surfaces includes a first portion having a predetermined axial width and extending from the axial center of the corresponding pillar toward a small-diameter end of the retainer, and a second portion having a predetermined axial width and extending from the axial center toward a large-diameter end of the retainer such that the first portion and the second portion can be brought into contact with the at least one retainer guiding surface over the entire surface areas of the first and second portions.

2. The tapered roller bearing according to claim 1, wherein the retainer is a resin retainer.

3. The tapered roller bearing according to claim 2, wherein the at least one retainer guiding surface comprises the raceway.

4. The tapered roller bearing according to claim 2, wherein the guided surfaces lie on an imaginary convex surface.

5. The tapered roller bearing according to claim 2, wherein the retainer further includes grooves recessed from the respective guided surfaces, and helically extending about a center axis of the retainer.

6. The tapered roller bearing according to claim 2, wherein the retainer further includes herringbone grooves recessed from the guided surfaces, and circumferentially spaced apart from each other at regular intervals.

7. The tapered roller bearing according to claim 1, wherein the retainer is a steel plate, and
   wherein the guided surfaces comprise coating portions having a friction coefficient lower than a friction coefficient of the steel plate.

8. The tapered roller bearing according to claim 7, wherein the at least one retainer guiding surface comprises the raceway.

9. The tapered roller bearing according to claim 1, wherein the at least one retainer guiding surface comprises the raceway.

10. The tapered roller bearing according to claim 9, wherein the guided surfaces lie on an imaginary convex surface.

11. The tapered roller bearing according to claim 9, wherein the retainer further includes grooves recessed from the respective guided surfaces, and helically extending about a center axis of the retainer.

12. The tapered roller bearing according to claim 9, wherein the retainer further includes herringbone grooves recessed from the guided surfaces, and circumferentially spaced apart from each other at regular intervals.

13. The tapered roller bearing according to claim 1, wherein the guided surfaces lie on an imaginary convex surface.

14. The tapered roller bearing according to claim 1, wherein the retainer further includes grooves recessed from the respective guided surfaces, and helically extending about a center axis of the retainer.

15. The tapered roller bearing according to claim 1, wherein the retainer further includes herringbone grooves recessed from the guided surfaces, and circumferentially spaced apart from each other at regular intervals.

* * * * *